US006326904B1

(12) United States Patent
Parent et al.

(10) Patent No.: US 6,326,904 B1
(45) Date of Patent: *Dec. 4, 2001

(54) MAP POSITIONING SYSTEM

(75) Inventors: Christopher A. Parent, West Springfield; James A. Richmond, Monson, both of MA (US); James R. Voss, Dupont, IN (US)

(73) Assignee: United Innovations, Inc., Holyoke, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,120

(22) Filed: May 13, 1998

(51) Int. Cl.[7] .................................................. G08G 1/123
(52) U.S. Cl. ......................... 340/995; 340/990; 701/207; 701/208
(58) Field of Search ..................................... 340/990, 995; 701/207, 208

(56) References Cited

U.S. PATENT DOCUMENTS

| | | | |
|---|---|---|---|
| 2,485,663 | * 10/1949 | Rusch et al. | 340/995 |
| 4,053,893 | * 10/1977 | Boyer . | |
| 4,061,995 | * 12/1977 | McCrickerd . | |
| 4,135,190 | * 1/1979 | DiMatteo et al. | 340/995 |
| 4,393,448 | 7/1983 | Dunn et al. . | |
| 4,862,374 | * 8/1989 | Ziemann | 340/995 |
| 4,893,247 | * 1/1990 | Waudoit | 340/995 |
| 5,059,970 | * 10/1991 | Raubenheimer et al. | 340/995 |
| 5,089,816 | * 2/1992 | Holmes, Jr. | 340/995 |
| 5,113,178 | * 5/1992 | Yasuda et al. | 340/995 |
| 5,904,867 | * 5/1999 | Herke | 219/121.6 |

* cited by examiner

Primary Examiner—Brent A. Swarthout
(74) Attorney, Agent, or Firm—Cantor Colburn LLP

(57) ABSTRACT

A map positioning system is presented. The map positioning system has a rectangular or X-Y drive having a map support surface coupled thereto and receptive to a map. The X-Y drive mechanism is computer controlled to drive an indicator to a definite coordinate relative to the map support thereby illuminating the exact coordinate point when the indicator is energized.

9 Claims, 3 Drawing Sheets

MAP POSITIONING SYSTEM

BACKGROUND OF THE INVENTION

1. Field of the Invention

This invention relates generally to motive power systems involving computerized drive mechanisms and is more specifically directed to a computerized drive mechanism for driving an LED (light emitting diode) indicator on a map display so that multiple coordinate points may be indicated on the map.

2. Brief Discussion of the Related Art

Positioning systems are well known and cable-driven positioning systems are generally known in the art. For example, fixed sheet plotters fixedly position a sheet on a flat bed and a pen, used for writing or cutting, is held on a traveling rail which travels in both directions, i.e. back and forth along the X-axis such that the pen travels in both directions, and back and forth along the Y-axis on the sheet held and fixed on the flat bed, whereby images are formed on the sheet using the pen for writing or cutting.

Positioning systems and plotting systems are also used in navigational systems to track a vessel or vehicle or to create a permanent record of the movement of same. For example, in U.S. Pat. No. 4,393,448 to Dunn et al., there is disclosed a navigational plotting system utilizing hyperbolic navigation coordinates to drive the plotter for the track of the vessel and when required to superimpose hyperbolic time difference lines either on a chart or on a plain charting surface. Navigational plotting systems are useful in plotting the track of the vessel or vehicle on a plotting surface so as to achieve a permanent record of the vehicle's progress. One use of such a system is illustrated in terms of commercial fishing. In commercial fishing, it is often times necessary to display the area that a vessel traverses over a pre-determined fishing ground so that the pilot of the vessel may more accurately control the vessel for complete coverage of the fishing ground.

Navigational plotting systems are also useful in air-sea search missions in terms of giving the navigator a clear picture of the area searched so that completeness of the search may be ascertained as well as the prevention of duplication of efforts. In addition, navigational plotters create a permanent record of the track of the vehicle so that proximity to navigational hazards may be readily ascertained; therefore, allowing the progress to a given point, harbor or place or refuge to be quickly ascertained and displayed.

Positioning systems also have important use in military applications for general mapping and cartography purposes. It is desirable to have a positioning system which can quickly indicate multiple targets or track the movement of troops or objects (e.g. vessels, aircraft, land vehicles) relative to conventional military maps.

SUMMARY OF THE INVENTION

In accordance with the present invention, the map positioning system (e.g., the aforementioned cable-drive positioning system) comprises a rectangular or X-Y drive having a map support coupled thereto, wherein the map support has a front surface and a back surface with the front surface receiving a map. The drive mechanism drives an LED (light emitting diode) or other suitable indicator to a correct position relative to the back surface of the map support thereby illuminating an exact coordinate on the map. The map positioning system of the present invention is particularly suitable for military applications including military mapping and cartography purposes. Any suitable map may be positioned on the map support and multiple targets (i.e., locations or coordinates) may be quickly indicated on the map by use of the indicator which is driven by the computer controlled X-Y drive. The X-Y drive unit positions the indicator behind the map and shows an exact coordinate specified from a computer system via standard HPGL commands. The map support may include map guide lines or pins to ensure proper positioning of the map on the map support. Therefore by properly aligning the map on the map support surface via map guide lines or pins, the computer coordinates are easily matched to the map coordinates. Typical uses of the system of the present invention in a military setting include but are not limited to locating enemy fire, tracking friendly ship positions or tracking drone flight paths. However, other non-military applications are also contemplated by the present invention, e.g., navigational tracking.

The rectangular or X-Y drive comprises a pair of driving motors which have a capacity for moving a carrier in arbitrary motions over a defined area. Preferably, this device is computer controlled and the X-Y drive is driven responsively to intelligence from the computer. The driving motors function separately or unisonly through appropriate trains to drive the carrier over a planar area. Rotation of either motor alone will be seen to move the carrier diagonally. The desired positioning is normally attained by the simultaneous rotation of both motors. A protective cover may also be provided to secure the map in a proper position on the map support surface and to protect the map from any damage or contaminants. The construction of the map positioning system is such that it is designed to pass full vibration and shock testing in accordance to military specifications.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 1:
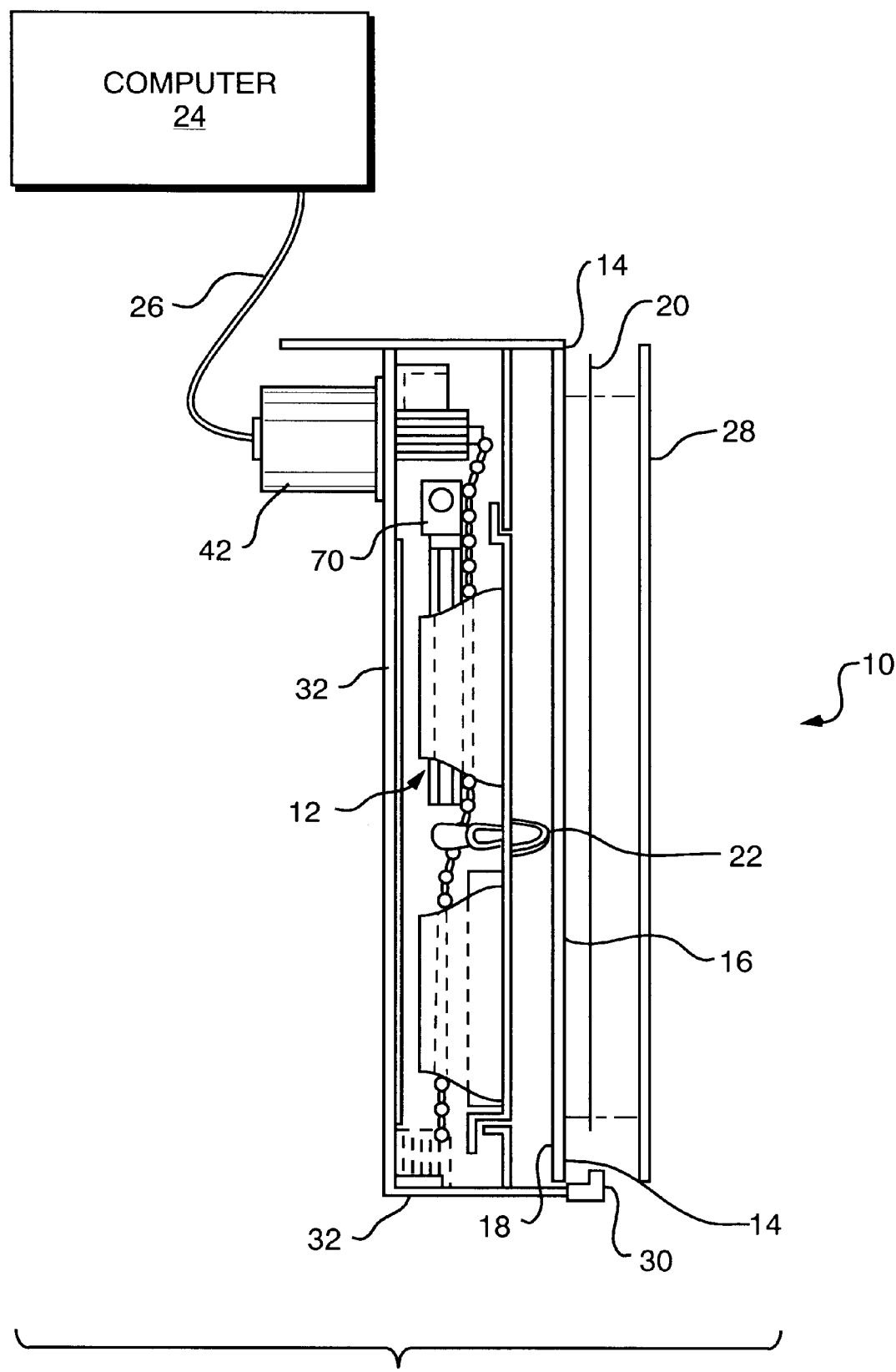
FIG. 1 is a party exploded side crosssectional view and partial block diagram of the map position system in accordance with the present invention.

Turning now to FIG. 1, a map positioning system is generally shown at 10. System 10 comprises a rectangular or X-Y drive 12 having a map support 14 coupled thereto. The map support 14 has a front surface 16 and a back surface 18 with the front surface 16 receiving a map 20. The drive mechanism 12 drives an indicator 22 to a desired position relative to the back surface 18 of the map support 14 thereby illuminating an exact coordinate on the map 20 when indicator 22 is energized. Preferably, indicator 22 comprises an LED (light emitting diode). A computer 24 is connected to drive mechanism 12 by way of cable 26 which permits computer 24 to communicate with drive mechanism 12, as described more fully hereinbelow.

The map positioning system 10 is particularly useful in a military setting where the system may be used to locate enemy fire, track friendly ship positions or track drone flight paths. Any suitable map 20, such as a standard paper map, may be positioned on the map support 14, which preferably comprises a material sufficiently transparent so as to permit indicator 22 to be visible through the map material when the indicator 22 is energized. The map support 14 preferably further includes map guide lines or pins 110 to ensure proper positioning of the map 20 on the map support 14. Proper positioning of the map 20 is important because the X-Y drive 12 is computer controlled and operates within a defined coordinate system covering a delineated area of the map support surface 14. To ensure a proper interface between the computer software and the X-Y drive 12 and consequently proper positioning of the indicator 22 relative to a specific coordinate point on a positioned map 20, the coordinate system of both needs to be the same (or transferable). After properly positioning the map 20 on the map support 14, a protective cover 28 may be placed over the map 20 to further secure the map 20 to the map support 14 and to protect the map 20 from environmental contaminants and tearing. Protective cover 28 is secured to map support 14 by retaining clip 30 or by other suitable retaining means. Retaining clip 30 is attached to a housing 32. The protective cover 28 may be composed of any suitable transparent material and preferably comprises a thin sheet of transparent plastic. When the protective cover 28 is disposed on the map 20, the map 20 and its details must be viewable by those viewing map 20.

Figure 2:
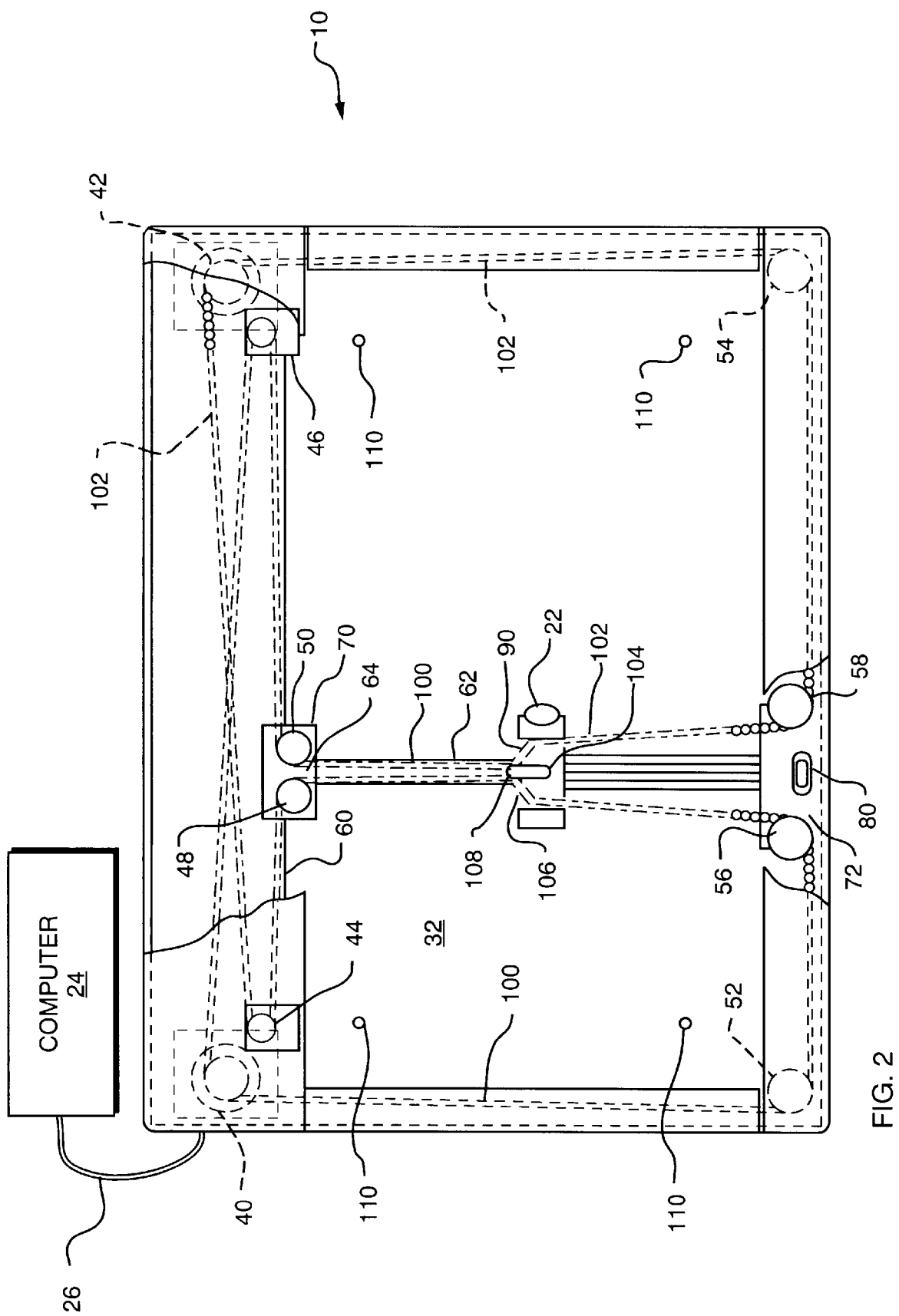
FIG. 2 is a view in top plan showing the map positioning system of the present invention.
Figure 3:
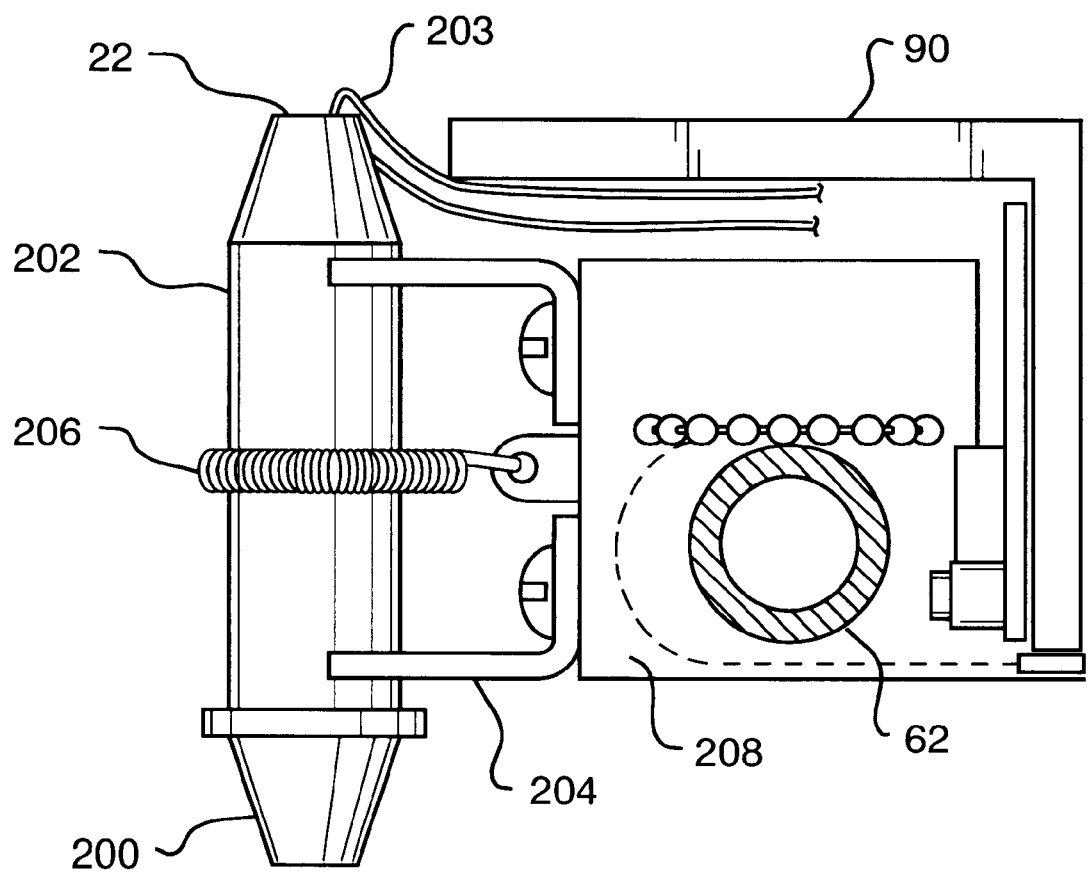
FIG. 3 is an enlarged side view of the carriage assembly having an LED indicator mounted thereto, in accordance with the present invention.

Turning now to FIG. 2, rectangular or X-Y drive 12 of the present invention is generally shown. As shown, a pair of fixed-position driven motors 40 and 42 are fixed on housing 32, a sequential series of pulleys 44, 46, 48, 50, 52, 54, 56 and 58, a fixed guide rail 60, a movable guide rail 62 normally perpendicularly disposed as to guide rail 60 but pivotable relative thereto by means of a pivot or hinged joint 64, a pair of spaced carriages 70 and 72, a carriage 70 mounting pulleys 48 and 50 and movable along fixed guide rail 60, carriage 72, mounting pulleys 56 and 58 and being movable along movable guide rail 62, and carrier 90 slidably mounted on movable guide rail 62. A support wheel 80 is mounted on carriage 72. Pulleys 44 and 46 are mounted on housing 32. Drive 12 comprises a rectangular drive system with the significant characteristic that the ultimate positional accuracy of the driven member 90 is maintained using small and lightweight first and second carriages 70, 72. The motion of the driven member or carrier 90, having indicator 22 mounted thereon, is provided by a chain (i.e., a drive member) 100, 102 which is motivated by motors 40, 42 fixedly mounted on housing 32.

The chain will be considered to consist of two parts, namely part 100, represented by solid lines, and part 102, represented by dash lines which chain is entrained in turn about the freely rotatable drive pulleys of the drive motors and the pulleys as will be described for driving and orienting carrier 90. It is best to consider each chain part 100, 102 separately or individually in order to appreciate more readily the capability of the chain parts to orient carrier 90 and hold same in desired orientation.

Chain 100, 102 is attached directly to the driven member 90, eliminating the possibility of lost motion between the motor drivers and the driven member 90. Driven carrier 90 is movable along and relative to movable guide rail 62 and chain parts 100, 102 cooperantly allow a free translation of carrier 90 while forcing the carrier 90 to be held rigidly in any angular orientation and this is so whether one drive motor is rotating while the other drive motor is not rotating or both drive motors are rotating simultaneously. Whatever the rotation or non-rotation of the drive motors, the motion is such that as one chain part is driven the other chain part is driven responsively wherefor any desired positioning of the carrier is possible.

In following the chain train, one terminus of chain part 100 is seen to be fixed to a post 104 on carrier 90 and is entrained over pulleys 50 and 46, thence over the drive pulley of drive motor 40, and thence is entrained over pulleys 52 and 56 before return to the carrier where it is looped over a retainer 106, then passing outwardly from the carrier as chain part 102 for passage over pulleys 58 and 54, thence over the drive pulley of drive motor 42, and thence over pulleys 44 and 48 before return to the carrier when the opposite terminus is fixed to a post 108.

The stringing of the chain is such that the angular orientation of the first carriage 70 is maintained entirely by the chain and not at all by its constraining guide rail 60. It is this feature which makes possible a mechanism light-weight and compact in size and low in cost of production.

Since the positional accuracy of the driven member 90 (and therefore, the indicator 22) is ultimately determined by relative motions between the operating members, closely fit rigid structures are dictated while still allowing smooth and free motions between components. The motion of the driven element 90 is constrained in one direction by a stationary structure in the form of a rigid bar or guide rail 62. The mechanism used to drive the driven element 90 in a direction parallel to the guide rail 62 is mounted on housing 32. Size, weight and location being relatively unimportant, good positional accuracy, repeatability and rigidity are readily realized.

Although the employment of a pair of straight guide rails, one rail being hinged 60 and one rail 62 being pivotable relative to the other is disclosed, the positional accuracy is actually determined by the chain 100, 102. That is, no fixed angle is required to be structurally maintained by the guide rails 60, 62.

Assume first a rotative motion in drive motor 40, in a counterclockwise direction as viewed in FIG. 2, and assume further for the moment that drive motor 42 is non-rotative. The motion of carrier 90 will be upward and rightward. Clockwise rotation of drive motor 40, still with drive motor 42 remaining idle, will see the motion of the carrier as being downward and leftward. In a symmetrical way, if drive motor 42 rotates while drive motor 40 is non-rotative, the carrier is otherwise driven. Counter clockwise rotation of drive motor 42 causes the carrier to move downward and rightward whereas clockwise rotation causes movement upward and leftward. By combining and controlling the relative rotations of motors 40 and 42, obviously any desired motion of the carrier 90 (and therefore, the indicator 22) is achievable. In every case, the resultant motion is caused by the responsiveness of one of the chain parts to the movement of the other of the chain parts.

With no initial slack in chain part 100, its tensioning will not change when carriage 90 is moved in translation. Too, it will not offer any interference to the clockwise rotation of the carriage assembly around pivot 64, although counterclockwise rotation of the assembly around the pivot would be precluded by chain part 100. Similarly, chain part 102 would offer no interference with any translation of the carriage assembly but would prevent any clockwise rotation of the carriage assembly around pivot 64, although counterclockwise rotation around the pivot would be allowed.

Combining the effect of both chain parts, the carriage assembly is free to translate but is rigidly held in angular orientation. Retainer 106 holds the ends of the chain parts thereby establishing their lengths and by moving within this retainer one chain part is lengthened while the other is shortened, thereby changing the angular orientation of the carriage assembly.

It should be incidentally noted that if carrier 90 were moved along movable guide rail 62, the chain parts would move over their pulleys, but would not interfere with the motion. Again, to illustrate the motion of carrier 90, let drive motor 40 rotate in the clockwise direction while drive motor 42 holds chain part 102 still at the motor. As drive motor 40 rotates clockwise, chain part 100 is drawn from pulleys 52 and 56 and released to pulleys 46 and 50. The chain motion described would tend to move carrier 90 down and move the carriage assembly to the left or to move the carriage assembly and the carrier. However, either motion would cause chain part 102 to move.

If the carrier were to move down while the carriage assembly did not translate, chain part 102 would have to move the drive pulley at drive motor 42 in counter clockwise direction. On the other hand, if the carriage assembly were to move to the left without the carrier 90 moving down, chain part 102 would cause the drive pulley at drive motor 42 to rotate in clockwise direction.

Since motor 42 is not rotative in this example, the motion of the carriage assembly and the carrier must have equal motions to the left and down when the drive motor 40 rotates in clockwise direction. If drive motor 40 is rotated in the counter clockwise direction with drive motor 42 non-rotative, the motion of the carrier would be up and to the right. Contrariwise, if drive motor 42 rotates while drive motor 40 is not rotating, the carrier is driven in other directions. Counter clockwise rotation of drive motor 42 causes the carrier to move down and to the right whereas clockwise rotation causes rotation up and to the left. As aforesaid, by combining the rotations of drive motors 40 and 42, any motion of the carrier is possible. Further details concerning X-Y drive 12 are disclosed in commonly assigned U.S. Pat. No. 4,833,785 to Parent et al., which is herein incorporated by reference in its entirety.

In accordance with the present invention, indicator 22 is coupled to carrier 90 whereby actuation of drive motors 40, 42 positions carrier 90 and indicator 22 relative to map support 14. Computer 24 preferably has an indicator position control circuit will include digital to analog (D/A) converter circuitry which controls the X and Y movements of the indicator and whether the indicator 22 is energized thereby emitting light or not energized thereby emitting no light as when the indicator 22 is being quickly repositioned to show a different target or movement of an object relative to map 20.

The coupling between the indicator position control circuitry of the computer 24 and the X-Y mechanism 12 may be of conventional design, with the indicator 22 being conditioned in an energized mode (on) or a non-energized mode (off).

In the present example, the LED 200 is received in a connector or socket 202 having wires 203 connected thereto for powering (energizing) the LED. Indicator 22 is mounted on or held relative to a clamp 204 by a spring 206 or other suitable means, the clamp being fixed to a body 208 which is sleeved upon movable guide rail 62. Body 208 is mounted to carrier 90 so that indicator 22 may be readily positioned by movement of carrier 90. Carrier 90 being driven by the X-Y mechanism 12 as disclosed herein.

The X-Y drive 12 and indicator 22 coupled thereto are designed in accordance with the present invention to be responsively driven to the intelligence from computer 24. Computer-generated signals drive the motors of the X-Y drive 12 and its other components, including the indicator 22, so that the indicator 22 is readily movable to a desired, defined coordinate point relative to the back surface 18 of the map support 14. The indicator 22 may be quickly repositioned to a different coordinate point by further drive signals from computer 24.

It is within the scope of this invention that X-Y drive mechanism 12 may be vertically positioned relative to the ground whereby the map 20 is positioned on the map support 14 so that it may be easily viewed by a number of viewers. In another embodiment, the X-Y drive 12 is provided in horizontal relation to the ground and the map 20 is positioned on the map support 14 which is generally horizontal to the ground.

In accordance with the present invention, the map positioning system 10 is able to indicate multiple targets on map 20 quickly using this single indicator 22. Advantageously, this system may be used to locate or track troops or objects on any given map.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A map positioning system for indicating at least one coordinate point on a map comprising:

a map support for supporting a map at one surface thereof;

an indicator;

an X-Y drive mechanism disposed under said map support comprising a pair of spaced bidirectional drive motors, a plurality of spaced guide pulleys, and a length of elongated flexible drive member defining a closed loop having opposite free ends fixed to a carrier, said X-Y drive mechanism having said indicator disposed on said carrier, said X-Y drive mechanism positioning said indicator to illuminate a coordinate point on said map wherein said indicator is disposed beneath said map surface.

2. The map positioning system set forth in claim 1 wherein said X-Y drive mechanism is light weight and vibration and shock resistant.

3. The map positioning system of claim 1 wherein:

said X-Y drive mechanism is responsive to drive signals from a computer so that said indicator is readily movable to said selected coordinate point relative to said map support and quickly repositioned to a different and unrelated coordinate point in response to said drive signals.

4. The map positioning system set forth in claim 3 wherein said drive signals are standard HPGL commands.

5. The map positioning system set forth in claim 4 wherein said indicator is able to track and indicate multiple targets on said map.

6. A method of indicating a point on a map comprising:

positioning a map on a map support which is transmittable to light;

in an environment prone to heavy vibrations and shocks, positioning an indicator which is disposed beneath said map surface at a coordinate point of said map, said positioning of said indicator comprises directing control signals from a computer to a vibration and shock resistant X-Y drive mechanism, said X-Y drive mechanism comprising a pair of spaced bidirectional drive motors, a plurality of spaced guide pulleys, and a drive chain defining a closed loop having opposite free ends fixed to a carrier having said indicator, said X-Y drive mechanism being positioned under said map support; and illuminating said indicator to indicate said coordinate point of said map.

7. The method st forth in claim 6 wherein said directing control signals comprises directing standard HPGL commands from the computer to the X-Y drive mechanism.

8. The method of claim 6, wherein positioning said map comprises:

orientating said map on said map support relative to a coordinate system of said X-Y drive mechanism.

9. The method of claim 6, wherein said positioning of said indicator further comprises:

positioning said indicator relative to a back surface of said map support, whereby said indicator is visible through said map when illuminated.

\* \* \* \* \*